Dec. 21, 1965  C. R. HILPERT  3,224,537
FLUID OPERATED CLUTCH WITH OPERATOR SENSING SIGNAL
Filed Aug. 3, 1961  3 Sheets-Sheet 1

Inventor.
Conrad R. Hilpert.
By John W. Darby
Attorney

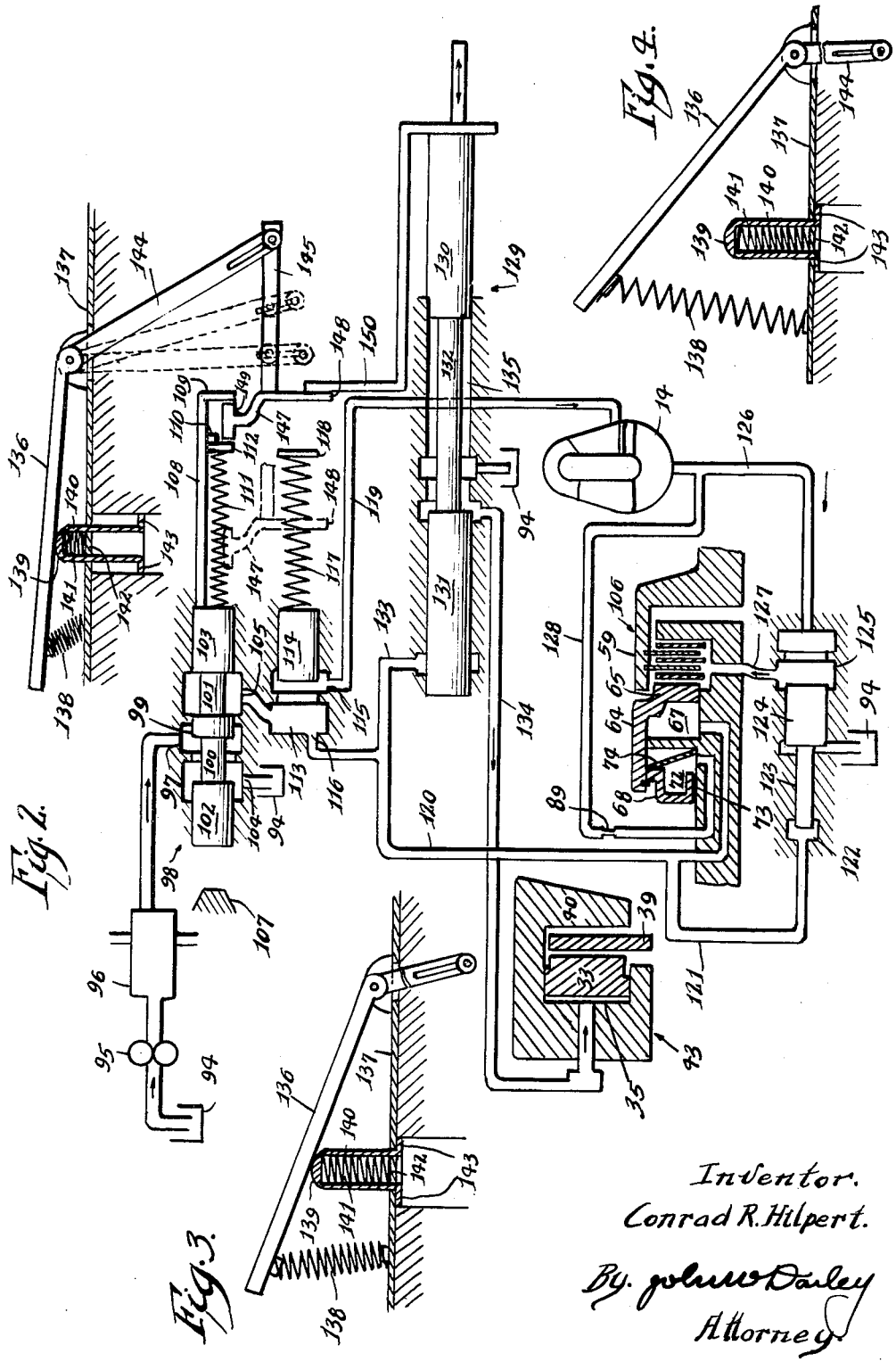

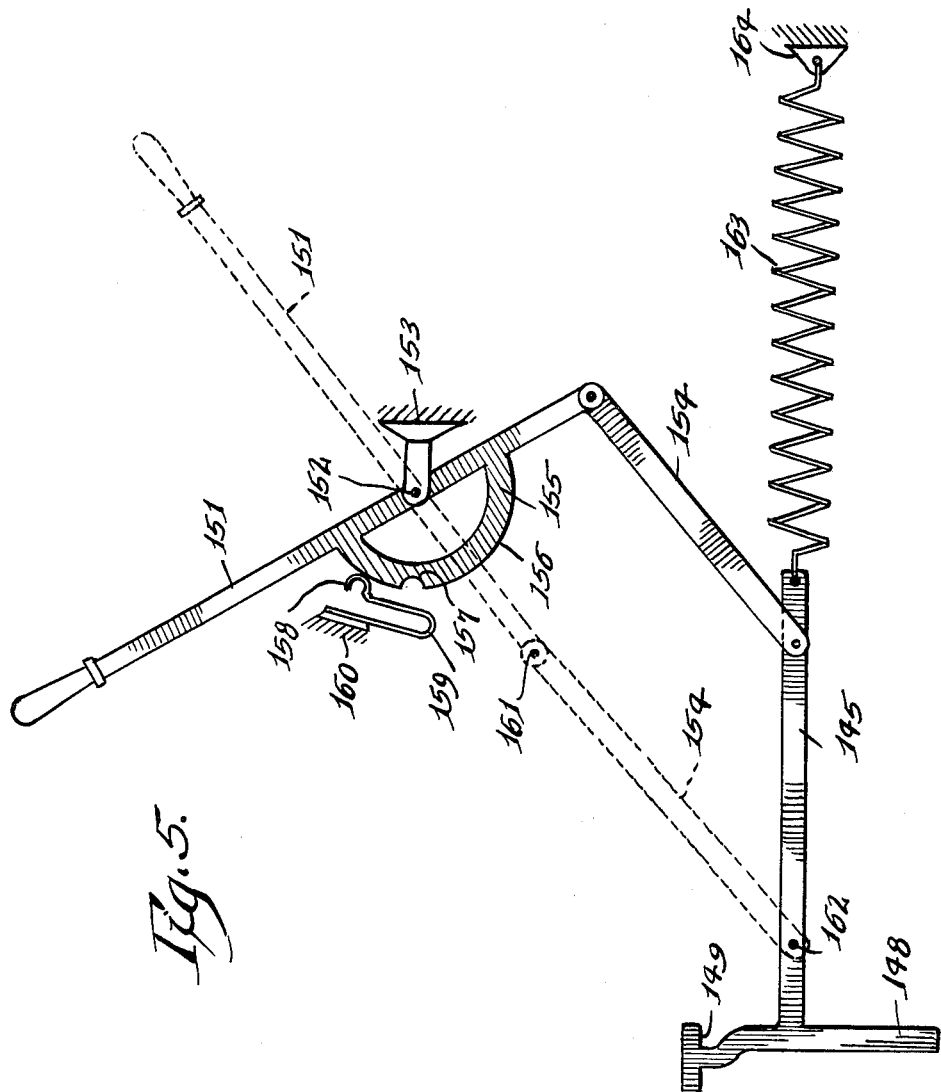

United States Patent Office 3,224,537
Patented Dec. 21, 1965

3,224,537
FLUID OPERATED CLUTCH WITH OPERATOR SENSING SIGNAL
Conrad R. Hilpert, Winnebago, Ill., assignor to Twin Disc Clutch Company, Racine, Wis., a corporation of Wisconsin
Filed Aug. 3, 1961, Ser. No. 129,038
2 Claims. (Cl. 192—85)

My invention relates to power transmissions of that type which include one or more hydraulically actuated friction clutches and an hydraulic torque converter as major components of the power train and more particularly to a control system therefor.

Hydraulically actuated friction clutches have long presented a problem with respect to securing a smooth, jerk-free engagement of the friction plates. In the usual situation and considering an engagement of the clutch, the clutch piston moves for a determined distance from a position of full release to one in which the plates are in contact, ordinarily termed the hydraulic freeplay. In a typical unit, the clutch piston is moved from a release to plate contact position at a relatvely low pressure since the only resistance is that due to moving the plates and overcoming the release springs, if any. With the plates in contact, however, axial movement of the clutch piston ceases and the rapid rise in hydraulic pressure causes the clutch plates to take up with a pronounced shock or jerk.

The above objectionable action is believed to be due to the absence of any control on the part of the operator, power transmissions of the type contemplated by this application being usable in wheeled and crawler tractors, bulldozers, scrapers, rollers and comparable heavy duty vehicle equipment. To apply power to the equipment, the operator moves a lever or pedal calling for torque, and feeling no response, further moves the control lever or pedal. This situation, including possible further moves of the lever, continues until the clutch takes up with a jerk. The basic deficiency in this conventional mode of control lies in the ignorance of the operator as to the reason for lack of response, whether it is due to the existence of freeplay or to the demand of the load for more torque. It has been applicant's experience that the operator will invariably and unwittingly be calling for more torque than the situation requires at the instant when the clutch plates are contacted by the piston with instantaneous pressure and torque rises and accompanying jerk.

Not only does the operator lack knowledge as to the length of time and control of pressure required for taking up the freeplay, but he is also unable to determine when and how much pressure is to be applied to the clutch plates after initial contact to secure smooth acceleration and gradually increasing torque. The variables of piston movement in taking up the freeplay and of pressure transfer at the end of the piston stroke in an engaging direction are wholly indeterminate on the part of the operator. Unless the factors of jerk and smooth acceleration are under operator control, smooth starts are impossible.

Other considerations involved in the present invention are the systemic relation in a power transmission of an hydraulic torque converter and a pair of hydraulically actuated clutches of the friction type.

One object of the invention is to provide an hydraulically actuated friction clutch which is conditioned so that transition from release to full engagement is at all times under the precise control of the operator.

A further object is to provide a power transmission including a master friction clutch conditioned as above and controlling output of the transmission, an hydraulic torque converter and an hydraulically actuated friction lockup clutch for determining direct drive through the transmission wherein any reduction in pressure applied to the master clutch automatically releases the pressure applied to the lockup clutch.

A further object is to provide a power transmission of the character indicated wherein the master clutch and hydraulic torque converter are linked in an hydraulic system in such a way that the basic pressure in the converter is controlled simultaneously with and is dependent upon pressure applied to the master clutch.

A further object is the provision of a control system for the master clutch characterized by a pause position which indicates to the operator that the takeup of the hydraulic freeplay is completed at relatively low pressure with the master clutch plates in relatively slipping and light friction contact and followed by a controlled pressure rise to the maximum engaging pressure.

A further object is to provide a power transmission of the character outlined wherein the master clutch and converter are systematically related so that an oil, constituting the hydraulic element, flows serially through the converter and over the master clutch plates for cooling thereof only when such plates are in contact.

In the drawings:

FIG. 2 is a schematic view of the transmission hydraulic system, partly in section, and including the controls therefor, both clutches being released.

FIGS. 3 and 4 are elevations, partly in section, showing positions of a pedal, pause control which are respectively successive to that shown in FIG. 1.

FIG. 5 is an elevation of a lever mechanism utilizing a detent type of pause control.

Figure 1:
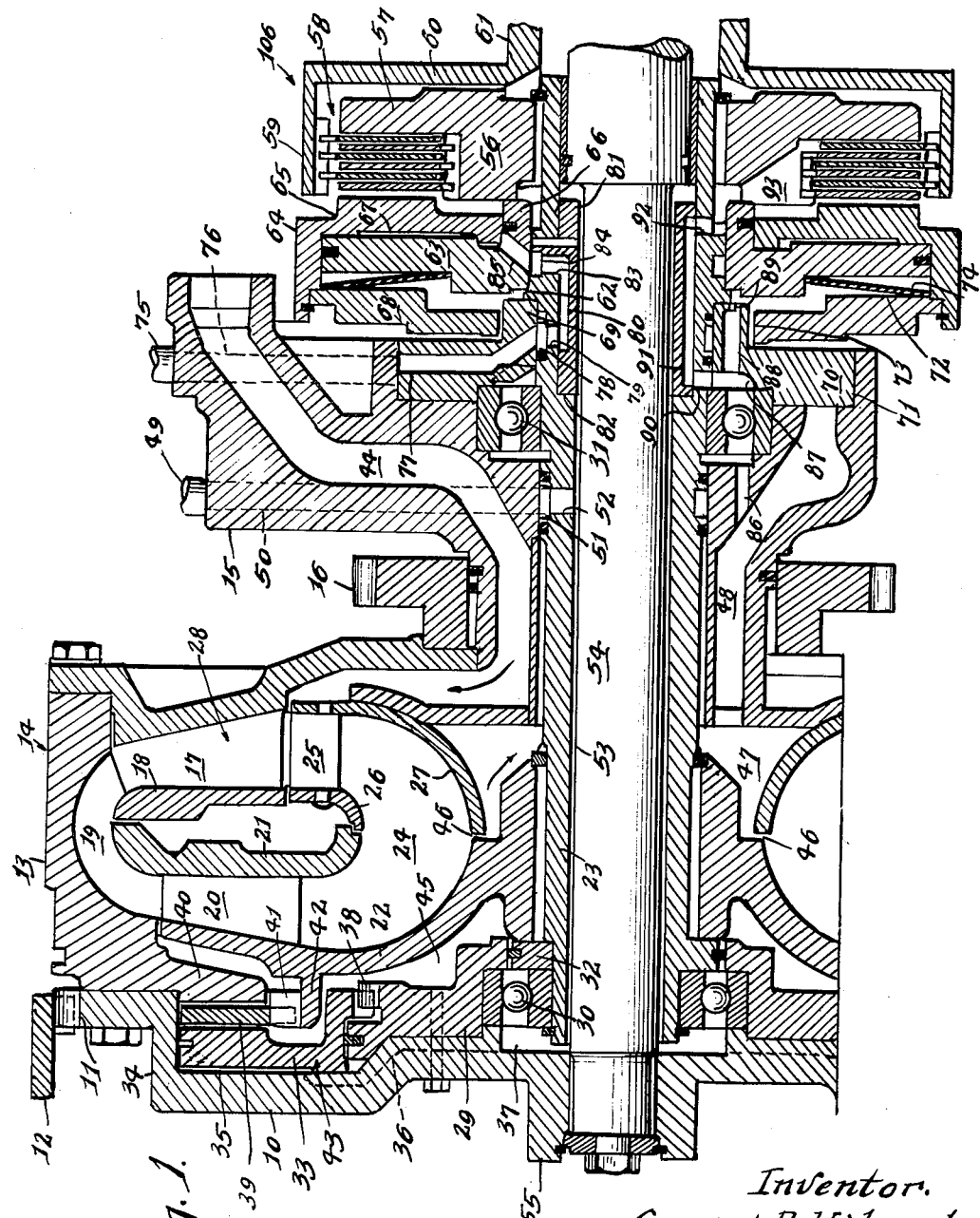
FIG. 1 is a fragmentary, sectional elevation of one form of the power transmission, the master and lockup clutches being released.

Referring to FIG. 1, there is shown one form of power transmission embodying certain features of the invention, but it will be understood that some aspects thereof, particularly the master clutch and its control, and association with the hydraulic torque converter, are capable of application to different types of transmission.

The numeral 10 designates an end ring which is peripherally toothed at 11 for driven engagement with an internally toothed ring or spider 12 that in connected to a source of power such as an engine. The ring 10 is secured to and closes the forward end of a rotating housing 13 forming part of an hydraulic torque converter 14 and the rear end of the housing 13 encircles and has sealing engagement with a stationary carrier 15 and includes a gear 16 for driving a pump that services the converter 14 and the master and lockup clutches, all as presently described. From the foregoing, it will be understood that the end ring 10 and housing 13 rotate together under the impulse provided by the spider 12 which actually may be the flywheel of the engine.

The housing 13 carries radial outflow impeller blades 17 which are bridged therebetween and a core ring 18 and the working liquid, assumed to be a suitable oil, discharged by the impeller blades flows through an outer, reversely curved passage 19 for delivery to radial, inflow turbine blades 20 which are bridged between a core ring 21 and a turbine ring 22 that is keyed to one end of a sleeve shaft 23 whose opposite end connects through a master clutch presently described with a gear transmission (not shown) of the associated vehicle. Oil discharged by the turbine blades 20 flows through an inner, reversely curved passage 24 for delivery to radial outflow, stator blades 25 positioned at the inlets of the impeller blades 17 and bridged between a core ring 26 and a stator ring 27 that is fast to the carrier 15.

The impeller, turbine and stator blades 17, 20 and 24, respectively, and the passages 19 and 24 are related to form a toroidal working circuit generally designated by the numeral 28. Further, it will be understood that the converter 14 is intended to be representative generally of such a unit and hence neither the shape of the circuit 28 nor the blade sizes and positions are restrictive.

On the converter side of the ring 10, a ring 29 is secured thereto and is journaled on a bearing 30 carried by the adjacent end of the sleeve shaft 23 and the latter is journaled in a bearing 31 mounted in the carrier 15. Close to the bearing 30, the inner, peripheral surface of the ring 29 has sealing contact with a shouldered portion 32 of the shaft 23 to retain the converter oil at this point, while the outer, peripheral surface of the ring 29 has sealing and relative sliding contact with the inner surface of an annular piston 33. The outer surface of the piston 33 has like contact with an annular portion 34 of the end ring 10 which otherwise defines with the piston 33 and ring 29 an annular cylinder 35 within which the piston 33 is slidable and which communicates through a radial passage 36 recessed in the ring 10 with an annular chamber 37 to the left of the bearing 30. The inner portion of the piston 33 has toothed, sliding connection with the ring 29 as indicated by the numeral 38 so that the piston 33 always rotates with the end ring 10 and hence with the converter housing 13.

When pressure is applied to the left side of the piston 33 as presently explained, the latter moves to grip an annular, driven, clutch plate 39 against an inwardly extending, annular portion 40 of the housing 13 which is positioned between the turbine ring 22 in the vicinity of the turbine blades 20 and the clutch plate 39. The inner periphery of the clutch plate 39 has toothed, sliding connection, as indicated by the numeral 41, with an annular offset 42 provided on the turbine ring 22.

From the above, it will be apparent that, with the clutch plate 39 in the release position shown in FIG. 1, and the engine running, the drive is through the converter 14 with the usual torque multiplication. For direct drive, the piston 33 is pressure moved to engage the clutch plate 39 against the housing portion 40 to thereby cause the turbine ring 22 to rotate at the speed of the housing 13. The piston 33, plate 39 and housing portion 40 together constitute a lockup clutch 43.

Working oil at a predetermined pressure is supplied to the converter 14, whenever oil pressure is present in the engaging chamber of the master clutch as presently described, through a passage 44 in the carrier 15 and flows outward between the stator ring 27 and the adjacent end of the housing 13 for delivery to the toroidal circuit 28 between the outlets of the stator blades 25 and the inlets of the impeller blades 17. When present in the converter 14, the oil completely fills the toroidal circuit 28 and also the annular chamber 45 between the turbine ring 22 and the ring 29, piston 33 and housing portion 40. The pressure of the converter oil biases the lockup clutch piston 33 to the release position shown.

Oil is discharged from the toroidal circuit 28 through an annular opening 46 communicating with the passage 24 and located between the turbine and stator rings 22 and 27, respectively, and into an annular chamber 47 included between the carrier 15 and the last noted rings. From the chamber 47, the oil flows into a passage 48 provided in the carrier 15 and from thence to certain parts of the master clutch assembly in a manner and for purposes presently described.

Oil pressure for the lockup clutch 43 is supplied through a pipe 49 and thence successively through a passage 50 in the carrier 15, an annular channel 51 and radial passage 52 in the sleeve shaft 23 to an annular passage 53 included between the interior of the sleeve shaft 23 and a power takeoff shaft 54 which extends therethrough, the delivery end of the passage 53 communicating with the annular chamber 37 and hence with the lockup clutch cylinder 35. The left end of the power takeoff shaft 54 has splined connection with a hub 55 forming part of the end ring 10 and so always rotates at engine speed while the opposite end of the shaft 54 has bearing support in the output end of the sleeve shaft 23 and extends therebeyond for conventional attachment to a variety of implements.

The right or output end of the sleeve shaft 23 has splined connection with a hub 56 suitably held against axial movement and having integrally formed therewith a back plate 57 serving as an abutment against which a plurality of clutch plates, generally indicated by the numeral 58, are gripped. Alternate plates have driven and relative sliding engagement with the hub 56 while the intervening clutch plates have driving and relative sliding engagement with a toothed annulus 59 forming part of a spider 60 whose hub 61 has a conventional connection with a gear transmission (not shown) with the driving axle of the vehicle.

Carried by and rotating with the sleeve shaft 23 and held against axial movement by fitting between the hub 56 and an annular rib 62 on the shaft 23 is an annular reaction plate 63 and slidable on the peripheral surface of the plate 63 in sealed relation thereto is a cylindrical shell 64. Preferably integral with the shell 64 at one end thereof is an annular piston 65 for engaging the clutch plates 58 and which is sealably slidable on a sleeve 66 forming part of the reaction plate 63 and defines therewith, the sleeve 66 and shell 64 an annular engaging chamber 67 to which oil under controlled pressure is supplied as desired and as subsequently described.

The opposite end of the shell 64 carries internally thereof and fast thereto a ring 68 whose inner peripheral surface is slightly spaced from an annular shoulder 69 provided on a ring 70 which fits within a recessed part 71 of and forms a part of the carrier 15. The ring 68 defines with the shell 64, reaction plate 63 and sleeve 69 an annular balance chamber 72 and the spacing of the ring 68 from the sleeve 69 defines an annular throttling passage 73 providing communication between the balance chamber 72 and a sump for a purpose presently explained. A release spring, specifically shown as a Belleville spring 74, is positioned in the balance chamber 72 and biases the assembly including the shell 64, piston 65 and ring 68 to the clutch release position shown in FIG. 1. Other types of springs may be employed in place of the Belleville.

To the extent shown in FIG. 1, oil flow to the engaging and balance chambers 67 and 72, respectively, is through a series of passages which will now be described. For the engaging chamber 67, relatively high pressure oil, controllable by the operator, is delivered by a pipe 75 for flow through connecting passages 76 and 77 in the carrier 15 and ring 70, respectively. The delivery end of the passage 77 connects through an annular channel 78 and radial passage 79 in the sleeve shaft 23 with one end of a longitudinal channel 80 provided in the outer surface of a sleeve 81 which is coaxial with and positioned in a counterbored portion 82 of the sleeve shaft 23, the sleeve 81 rotating with the sleeve shaft 23 and being spaced from the power takeoff shaft 54. The opposite end of the channel 80 connects successively through a radial passage 83 and an annular channel 84 in the sleeve shaft 23 and a passage 85 in the reaction plate 63 with the engaging chamber 67.

For the balance chamber 72, the oil discharging from the hydraulic torque converter 14 to the passage 48 as described above flows successively through a passage 86 and the bearing 31 into an annular chamber 87 included between the bearing 31 and ring 70. From the chamber 87, the oil flow divides, part moving through a passage 88 including a throttling orifice 89 in the ring 70 to the balance chamber 72 and the remainder moving successively through a radial passage 90 in the sleeve shaft 23, a longitudinal channel in the sleeve 81 and a radial passage 92 in the sleeve shaft 23 into a plurality of pockets 93 spaced around the hub 56 from which the oil centrifugally flows over the clutch plates 58 for cooling.

The foregoing structure is incorporated in a hydraulic system as schematically shown in FIG. 2 to which reference will now be made.

The system oil is withdrawn from a convenient sump 94 by a pump 95 driven by the gear 16 (see FIG. 1) and passed through a heat exchanger 96 to an inlet port 97 intermediately positioned in a control valve 98. Slidable in the valve 98 is a spool type, valve stem including an intermediate land 99 which connects by reduced necks 100 and 101 with end lands 102 and 103, all respectively. The valve 98 also includes an outlet port 104 connecting with the sump 94 and an outlet port 105 connecting with an operator controlled, pressure regulating valve presently described. In the position of the valve 98 shown in FIG. 2, the intermediate land 99 directs all output of the pump 95 to the sump 94 and pressure therefore does not exist in the port 105 and this valve position determines full release positions of the direct drive clutch 43 and also of the clutch which includes the plates 58, now designated as the master clutch 106.

The control valve 98 is conditioned to establish pressure in the port 105 and to deny flow to the sump 94 through the port 104 by shifting the valve stem until the intermediate land 99 is to the left of the inlet port 97 and at this time, the land 102 abuts a stop 107. To accomplish this movement, an arm 108 extends longitudinally from the land 103 and terminates in a transversely disposed ear 109 which is positioned in generally opposed relation to the adjacent end of the land 103. The arm 108 also carries a lug 110 which is spaced from the ear 109 in the direction of the land 103 and extends from the same side of the arm 108 as does the ear 109. A helical spring 111 is interposed between the end of the land 103 and a plate 112 which, when the control valve 98 is in the position shown in FIG. 2, abuts the lug 110.

The port 105 communicates with a chamber 113 in which is reciprocable a pressure regulating valve 114 and the chamber 113 further includes outlet ports 115 and 116 in which the pressure is determined by the position of the regulating valve 114. The opposite ends of a helical spring 117 respectively abut the regulating valve 114 and a push plate 118 which is movable in the manner presently described to load the spring 117 and thus determine pressures in the outlet ports 115 and 116.

The outlet port 115 communicates with the intake of the hydraulic torque converter 14 by what is shown entirely as a pipe 119 in FIG. 2, but it will be understood that the pipe 119 functionally includes the passage 44 in FIG. 1. The other outlet port 116 connects in FIG. 2 by the pipe 120 with the engaging chamber 67, the pipe 120 representing collectively the pipe 75 and the ensuing passages and channels above referred to and leading to the chamber 67 and as shown in FIG. 1, the pipe 120 being the relatively high pressure line.

Tapping the pipe 120 is a pipe 121 whose outlet connects with a chamber 122 in which is exposed one end of a piston 123 whose opposite end is enlarged to provide a pressure regulating valve 124 that is exposed in a chamber 125. The opposite ends of a pipe 126 connect respectively with the outlet of the converter 14 and the chamber 125, and a passage 127 connects the chamber 125 with the inner peripheries of the plates of the master clutch 106 to supply cooling oil thereto under stated conditions. In the FIG. 2 schematic, the pipe 126, chamber 125 and passage 127 are functionally identical with the passage 48 and the ensuing flow path to the clutch plates as shown in FIG. 1 and as described above. Also in FIG. 2, a pipe 128 including the orifice 89 (see FIG. 1) connects the pipe 126 adjacent the outlet of the converter 14 with the balance chamber 72, the pipe 128 representing collectively in FIG. 1 the passages 48, 86, chamber 87 and passage 88.

For the direct drive clutch 43, an operator controlled valve 129 of the spool type determines the application of high pressure oil thereto and includes lands 130 and 131 connected by a reduced neck 132. In the position shown in FIG. 2, the land 131 masks the outlet end of a pipe 133 which connects with the high pressure pipe 120 and the direct drive clutch cylinder 35 connects through a pipe 134 with a chamber 135 between the lands 130 and 131 and thence with the sump 94 so that the direct drive clutch 43 stands released. The pipe 134 in FIG. 2 represents collectively the pipe 49 and the ensuing passages and channels leading to the direct drive cylinder 35 as shown in FIG. 1.

An important feature of the invention resides in the knowledgeable control on the part of the operator of the apply pressure between full release and full engagement of the master clutch 106 and of the torque output of the transmission up to the respective maximum values thereof. One medium of control, in conjunction with the pertinent parts described above, takes the form of a pedal 136 which is pivoted at one end on a base 137 that may be provided by the associated vehicle or by a convenient part of the transmission and interposed between the opposite or free end of the pedal 136 and the base 137 is a helical spring 138. Also acting against the pedal 136 between the pivot thereof and the spring 136 and during a stated portion of pedal movement, which is upward from the position shown in FIG. 2, is the closed end 139 of a housing 140 which is slidable through the base 137 and encloses a helical spring 141 which is interposed between the housing end 139 and a part 142 of the base 137. In the FIG. 2 position, the spring 141 is fully loaded and upward movement of the housing 140 under the thrust of the spring 141 and as permitted by upward movement of the pedal 136 is limited by housing ears 143 which engage the under side of the base 137.

Fixedly connected to the opposite end of and moving with the pedal 136 is one end of an arm 144 whose opposite end connects in such a way with one end of a pushrod 145 that swings of the arm 144 effect longitudinal movements of the pushrod 145. The opposite end of the pushrod 145 carries laterally disposed and oppositely extending arms 147 and 148. The arm 147 terminates in a T 149 which is positioned between the ear 109 and plate 112 so that when the pushrod 145 is moved in opposite directions, respectively, the T 149 either engages the plate 112 and loads the spring 111 or engages the ear 109 with resultant position changes in the control valve 98. The other pushrod arm 148, is, in the position of parts shown in FIG. 2, in contact with one side of an arm 150 that is carried by the control valve 129. The relationship between the arms 148 and 149 is such that the pushrod 145 can be moved to the left without affecting the arm 150, but the arm 148, in any retracting movement of the pushrod 145 rightward to the position shown, will engage the arm 150 to retract the control valve 129 if then occupying a leftward position.

In describing the operation of the transmission and its systemic control, it will be assumed that the engine is idling and that the several parts occupy the positions shown in FIG. 2. Since the pedal 136 is then depressed by the operator to its lowermost position as in FIG. 2 to thereby load the springs 138 and 141, the control valve 98 directs the entire output of the pump 95 to the sump 94 and pressure does not exist in the outlet ports 115 and 116 of the pressure regulating valve 114. The master clutch 106 and the direct drive clutch 43 therefore are released and there is no oil flow to the converter 14 and to the plates of the master clutch 106. The foregoing represents the systemic condition when a shift is made in the associated gear transmission and if the latter is of the clash gear type, gear meshing is facilitated due to the absence of oil flow over the plates of the master clutch 106 which materially reduces the drag of such plates.

The vehicle is set in movement by drive through the converter 14 and for this purpose, the operator permits the pedal 136 to swing upwardly due to the thrust of the springs 138 and 141, but under the control of the operator so that the pushrod 145 begins moving towards the left and the T 149 begins to compress the spring 111 and to effect a leftward shift of the control valve 98 until its land 102 abuts the stop 107. All output of the pump 95 is then directed to the outlet port 105 and thence to the chamber 113. Oil then begins flowing through the pipe 119, converter 14, pipe 126, chamber 125, and passage 127 to the plates of the master clutch 106 and thence to the sump 94, also through the pipe 120 to the engaging chamber 67 and through the pipe 121 to the chamber 122, and through the pipe 128 to the balance chamber 72. The purpose of the latter chamber is to centrifugally balance its oil content with that in the engaging chamber 67. When pressure exists in the pipe 128, the oil in the balance chamber 72 flows to the sump 94 through the throttling passage 73.

After the land 102 abuts the stop 107, continued movement of the pushrod 145 contacts its arm 148 with the push plate 118 to thereby effect through the spring 117 movement of the pressure regulating valve 114 towards the left. This movement of the valve 114 begins to partially close the port 115 so that the pressure in the port 116 begins to rise relative to that in the port 115 and starts the piston 65 moving in a master clutch engaging direction. The same pressure rise is active against the exposed end of the piston 123 which shifts the pressure regulating valve 124 to the right to raise the pressure in the chamber 125 and so establish a basic working pressure in the converter 14, assumed by way of example to be 40 p.s.i. This basic converter pressure is reached when the maximum pressure is applied to the engaging chamber 65 as will be subsequently described.

The upward movement of the pedal 136 with accompanying shift of the pushrod 145 continues under the restraint imposed by the operator, foot or hand, until the housing ears 143 engage the base 137 (see FIG. 3). The movement of the piston 67 from the full release position shown in FIG. 2 to that in which the plates of the master clutch 106 are placed in incipient contact is accomplished at relatively low pressure since the pressure regulating valve 114 has not yet reached a position establishing maximum engaging pressure for the master clutch, as sumed by way of example to be 150 p.s.i.

The stoppage of the housing 140 by the ears 143 provides a limit for exerting pressure by the housing 140 against the pedal 136 and this position is immediately felt by the operator due to the reduction in spring pressure acting against the pedal 136. At this point, termed the pause position, the operator holds the pedal 136 stationary and waits until the plates of the master clutch 106 are in relative sliding contact at the indicated relatively low pressure. Knowledge of this conditioning of the plates 58 of the master clutch 106 is immediately known to the operator from the overall characteristics of the situation. For example, the engine is now under slight load which will occasion a change in its tone and there may be a typical sound emitted by the drive lines coming under torque. Importantly at this stage of the situation, the pressure in the engaging chamber 67 is not only relatively low, but it is a pressure which has been consciously established by operator control.

Thereafter, the pedal 136 continues its upward movement due to the thrust of the spring 138 and under operator restraint to the other terminal position shown in FIG. 4. During this movement, the pushrod arm 148 continues to load the spring 117 through the push plate 118 with consequent further pressure rise in the engaging chamber 67 up to the maximum value and at this point, the arms 147 and 148 occupy generally the dotted positions shown in FIG. 2. This pressure rise is gradual and is reflected in a gradually increasing output torque and both of these factors are at all times under the knowledgeable control of the operator. The master clutch 106 will therefore fully engage without jerk since there is no abrupt rise in pressure either when the clutch plates 58 first contact or thereafter. Moreover, this type of control is particularly useful in inching movements of the vehicle for obvious reasons. The springs shown in FIG. 2 are related to insure the foregoing operation.

From the above, it will be apparent that the pause position provides a definite point in the control at which to wait for the indication of clutch plate contact at the relatively low pressure, the operator determining when and the time of application. During pressure rise, the operator determines the initiation of this rise from the relatively low value and the gradual increase in the rise up to maximum engaging value.

The arrangement of the pedal 136 and its thrusting springs 138 and 141 is intended to generally show a mechanism which is sensing with respect to the feel of the operator by reason of the sharp change in spring rate. Other sensing variations may be employed such as a click provided by a detent structure.

Considering direct drive, it will be apparent that with the parts positioned as shown in FIG. 2, the direct drive clutch 43 cannot be engaged merely by shifting the control valve 129 to the left to connect the pipes 133 and 134. At this time, pressure is non-existent in the chamber 113 and the pedal 136 is operator held in the down position shown in FIG. 2 so that the arm 148 blocks movement of the arm 150 carried by the control valve 129. Whenever the vehicle is left unattended with the engine idling, the pedal 136 may be held in its lowermost position by any conventional means.

With maximum pressure established in the chamber 113 and the arm 148 therefore occupying the dotted position shown in FIG. 2, it is possible for the operator to shift the control valve 129 to the left and thus connect the pipes 133 and 134 to apply the relatively high pressure to the direct drive clutch 43. This conditioning does not affect the application of the same pressure to the master clutch 106. The porting of the control valve 129 is such that the direct drive clutch 43 cannot be engaged until the regulating valve 114 has established the relatively high pressure in the chamber 113. In the event that pressure in the chamber 113 is reduced by control on the regulating valve 114, the engagement of the arm 148 with the arm 150 immediately returns the control valve 129 to the position shown in FIG. 2 and thus connects the direct drive clutch cylinder 35 with the sump 94. This safety arrangement prevents slipping of the direct drive clutch 43.

It will be apparent further that with the parts conditioned as in FIG. 2, oil is not supplied to the converter 14 and the plates of the master clutch 106, but when the transmission is conditioned for service, cooling oil flows serially through the converter and over the indicated plates. Moreover, the converter basic pressure is controlled simultaneously with and is dependent upon the clutch pressure.

In FIG. 5 is shown a variant control linkage which may be used in place of the pedal assembly shown in FIG. 2. A hand lever 151 is intermediately pivoted at 152 on a convenient part of the transmission or vehicle designated by the numeral 153 and the end of the lever 151 opposite its handgrip is pivotally connected to one end of a link 154 whose opposite end pivotally connects with the end of the pushrod 145 remote from the arms 148 and 149. The linkage connection is such that rotations of the lever 151 about the pivot 152 effect movements of translation of the pushrod 145. The lever carries an offset 155 which includes a curved track 156 provided with a transverse groove 157 at a designaated point thereof. The free, parti-arcuate end 158 of a U-shaped spring 159 is conditioned to ride along the track 156 and the opposite end of the spring 159 is fast to a convenient base 160.

When the parts are in the full line positions shown in FIG. 5, the transmission is conditioned as in FIG. 2, both clutches being released and the lever 151 and its associated parts functionally corresponding to the pedal 136 and its immediately associated parts.

To start the operation, the lever 151 is moved clockwise with the spring end 158 riding along the track 156 until it engages the groove 157. This engagement can be felt by the operator and the lever is then in the pause position as defined and described above. After the termination of the pause period, the operator further moves the lever 151 clockwise with effects on the transmission as already outlined until it reaches the dotted position shown which determines the maximum torque transmitting condition of the master clutch 106. In the latter position of the lever 151, the pivotal connection 161 of the link 154 therewith is in overcenter and locked relation with respect to the pivot 152 of the lever 151 and the pivot connection 162 of the link 154 with the pushrod 145. The clockwise movement of the lever 151 is made against the pull of a spring 163 whose opposite ends are respectively connected to the adjacent end of the pushrod 145 and a convenient part 164. When the lever 151 is moved towards the full line or clutch disengaged position, it is only necessary to break the overcenter condition and then the spring 163 takes control and returns the pushrod 145 to the release position shown in FIG. 2.

I claim:

1. A power transmitting structure comprising a pressure liquid source, a hydraulically actuated clutch including a plurality of friction plates, a piston member and a chamber for receiving pressure liquid to move the piston member towards the plates, a pressure regulating valve interposed between the source and clutch, a rockable pedal for varying the position of the valve between limit positions thereof respectively determining full release of the plates and a relatively high pressure in the chamber to establish a maximum torque transmitting condition of the plates and including an intermediate relatively low pressure position, means associated with the rockable pedal including a plurality of spring means compressed by the pedal when in a position determining full release of the plates, and means for preventing thrusting of some of the spring means against the pedal when the latter reaches said intermediate position to provide a sensing signal to the operator to pause in said intermediate position until the plates are in relative sliding contact, continuing movement of the pedal thereafter establishing varying valve positions determining a gradual pressure rise in the chamber to the maximum value.

2. A power transmitting structure comprising a pressure liquid source, a hydraulically actuated clutch including a plurality of friction plates, a piston member and a chamber for receiving pressure liquid to move the piston member towards the plates, a pressure regulating valve interposed between the source and clutch, a control valve for determining the admission of pressure liquid to the pressure regulating valve, operator controlled means common to and mechanically connectible with the control and pressure regulating valves, the operator controlled means in one condition closing the control valve to deny pressure liquid to the pressure regulating valve and to thereby determine a full release of the plates and being movable to first advance the control valve to a stop position admitting pressure to the pressure regulating valve and to thereafter variably position the pressure regulating valve to determine the application of selected pressures to the chamber including a relatively high pressure to establish a maximum torque transmitting condition of the plates and an intermediate, relatively low pressure, and means associated with the operator controlled means and locatable in a position corresponding to a pressure regulating valve position determining said relatively low pressure in the chamber to provide a sensing signal to the operator to pause in said intermediate position until the plates are in relative sliding contact, continuing movement of the operator controlled means thereafter establishing varying valve positions determining a gradual pressure rise in the chamber to the maximum value.

References Cited by the Examiner

UNITED STATES PATENTS

| | | | |
|---|---|---|---|
| 1,938,780 | 12/1933 | Nenninger et al. | |
| 2,151,153 | 3/1939 | Rode et al. | 192—85 |
| 2,286,671 | 6/1942 | Crittenden et al. | 192—87 |
| 2,301,099 | 11/1942 | Upp | 192—87 |
| 2,669,330 | 2/1954 | Banker. | |
| 2,727,611 | 12/1955 | Folley et al. | 192—85 |
| 2,925,156 | 2/1960 | Grant et al. | |
| 2,968,967 | 1/1961 | Ross | 74—732 |
| 3,004,447 | 10/1961 | Sand | 192—85 |
| 3,033,335 | 5/1962 | Hause | 192—3.2 |
| 3,040,852 | 6/1962 | Svenson | 192—3.2 |

FOREIGN PATENTS 758,002   10/1933   France.

DAVID J. WILLIAMOWSKY, *Primary Examiner.*

THOMAS J. HICKEY, *Examiner.*